US012523856B2

(12) United States Patent
Asari

(10) Patent No.: US 12,523,856 B2
(45) Date of Patent: Jan. 13, 2026

(54) OFFSET OPTICAL SYSTEM INCLUDING PRIMARY MIRROR AND POSITIONALLY-OFFSET SUB-MIRROR

(71) Applicant: HOKKAIDO LABORATORY FOR RESEARCH IN ENVIRONMENT AND ENERGY, LLC, Hokkaido (JP)

(72) Inventor: Eiji Asari, Hokkaido (JP)

(73) Assignee: HOKKAIDO LABORATORY FOR RESEARCH IN ENVIRONMENT AND ENERGY, LLC, Hokkaido (JP)

( * ) Notice: Subject to any disclaimer, the term of this patent is extended or adjusted under 35 U.S.C. 154(b) by 330 days.

(21) Appl. No.: 18/004,593

(22) PCT Filed: Mar. 16, 2022

(86) PCT No.: PCT/JP2022/011871
§ 371 (c)(1),
(2) Date: Jan. 6, 2023

(87) PCT Pub. No.: WO2022/230416
PCT Pub. Date: Nov. 3, 2022

(65) Prior Publication Data
US 2023/0251476 A1 Aug. 10, 2023

(30) Foreign Application Priority Data
Apr. 26, 2021 (JP) .................. 2021-074093

(51) Int. Cl.
*G02B 17/08* (2006.01)
*G02B 21/04* (2006.01)
*G02B 23/06* (2006.01)

(52) U.S. Cl.
CPC ......... *G02B 17/0812* (2013.01); *G02B 21/04* (2013.01); *G02B 23/06* (2013.01)

(58) Field of Classification Search
CPC .... G02B 17/0312; G02B 17/08; G02B 17/06; G02B 21/04; G02B 23/06; G02B 23/02; G02B 5/10; G02B 3/06
See application file for complete search history.

(56) References Cited

U.S. PATENT DOCUMENTS 4,097,125 A * 6/1978 Suzuki ............... G03F 7/70233
359/859
4,240,707 A * 12/1980 Wetherell ........... G02B 17/0636
359/859
(Continued)

FOREIGN PATENT DOCUMENTS

JP  S57-204018 A  12/1982
JP  H11-014913 A  1/1999
(Continued)

OTHER PUBLICATIONS

International Search Report issued in application No. PCT/JP2022/011871, mailed Jun. 7, 2022.

*Primary Examiner* — Zachary W Wilkes
*Assistant Examiner* — Anna Smith
(74) *Attorney, Agent, or Firm* — MICHAEL BEST & FRIEDRICH LLP

(57) ABSTRACT

Provided is an optical system having a configuration capable of attaining a large light-gathering power while producing a maximum light-gathering power easily and inexpensively with a minimum material. An offset optical system according to the present invention comprises: a primary mirror composed of at least part of one of two optical element halves obtained by dividing an optical element having a concave shape curved only in one direction, in an intermediate position of a length along a curvature thereof, wherein the optical element is configured to reflect and focus light from an object, into a linear focus; a sub-mirror disposed between the primary mirror and the linear focus and con- (Continued)

figured to transmit or reflect light reflected by the primary mirror, thereby focusing the light into a point focus; wherein, when: a direction tangent to the curvature in the intermediate position of the optical element is defined as an x-axis; a direction which is perpendicular to the x-axis and in which the object is located is defined as a y-axis; and a direction orthogonal to the x-axis and the y-axis is defined as a z-axis, the sub-mirror is offset parallel to the x-axis by a given distance toward an edge of the primary mirror located distal to the y-axis.

6 Claims, 9 Drawing Sheets

(56) References Cited

U.S. PATENT DOCUMENTS

| | | | | |
|---|---|---|---|---|
| 4,623,223 A | * | 11/1986 | Kempf | G02B 17/06 348/51 |
| 4,747,678 A | * | 5/1988 | Shafer | G02B 17/0892 359/731 |
| 5,095,386 A | * | 3/1992 | Scheibengraber | G02B 27/0911 359/710 |
| 5,287,218 A | * | 2/1994 | Chen | G02B 27/4211 359/569 |
| 2010/0157313 A1 | * | 6/2010 | McKechnie | G02B 5/10 356/513 |
| 2014/0168802 A1 | * | 6/2014 | Whitehead | G02B 7/183 359/853 |

FOREIGN PATENT DOCUMENTS

| | | |
|---|---|---|
| JP | 2000-258695 A | 9/2000 |
| JP | 2005-164881 A | 6/2005 |
| JP | 2010-015116 A | 1/2010 |
| JP | 6602942 B1 | 11/2019 |
| JP | 2020-091315 A | 6/2020 |

* cited by examiner (a)

(b)

(a)

(b)

(a)

(b)

OFFSET OPTICAL SYSTEM INCLUDING PRIMARY MIRROR AND POSITIONALLY-OFFSET SUB-MIRROR

TECHNICAL FIELD

The present invention relates to an optical system usable for reflecting telescopes or the like, and more specifically to an optical system comprising a combination of a primary mirror obtained by curving a flat plate only in one direction to have a concave-shaped reflecting surface, and a sub-mirror capable of transmitting or reflecting light from the primary mirror, wherein the position of the sub-mirror is offset.

BACKGROUND ART

There have been heretofore developed many improved reflecting telescopes including a Newtonian reflecting telescope using a parabolic reflecting mirror. However, a high degree of accuracy required for polishing of a parabolic reflecting mirror used as a primary mirror, and complexity in the polishing process, have not changed to this day. Thus, in particular, medium- and large-size reflecting telescopes are liable to be expensive, and thus it is almost impossible to make a medium or larger-size reflecting telescope by oneself. Since a large-size parabolic reflecting mirror weighs several tons to several tens of tons, deformation of a mirror surface thereof due to gravity becomes a problem, wherein the deformation varies depending on the height of a celestial body to be observed. Thus, compensation for the deformation of the mirror surface is impossible, except for a reflecting telescope using a special latest control system, such as the Subaru telescope.

From a technical standpoint and in terms of cost, a medium or larger-scale reflecting telescope is difficult to fabricate without a large organization. Therefore, if a reflecting telescope with a large light-gathering power, requiring a huge amount of money, can be fabricated more inexpensively, easily and lightly in weight as compared to conventional telescopes, it becomes possible for general citizens to own or make by themselves a medium or larger-size reflecting telescope.

A system described in Patent Document 1 has been proposed as a technique to solve such a problem in medium- and large-size reflecting telescopes. In this system, two concave-shaped reflecting bodies are arranged such that their concave surfaces are opposed to each other. Rays of light emitted from an object are reflected by a first reflecting body which is a primary mirror, in a direction toward a second reflecting body opposed to the first reflecting body. The rays of light from the first reflecting body are reflected by the second reflecting body. The first and second reflecting bodies are curved, respectively, in two directions orthogonal to each other, and arranged such that respective linear foci thereof become integrated at a focal position. Since this system uses the concave-shaped reflecting bodies each of which can be formed from a thin sheet-shaped metal or the like, instead of using a high-cost parabolic reflecting mirror, it can allegedly be constructed lightly in weight and inexpensively. As disclosed in Patent Document 2, the applicant of the present application has also proposed a composite paraboloid telescope using the same principle as in the Parent Document 1.

In Parent Document 3, an optical system is proposed in which two cylindrical lenses are arranged such that cylindrical axes thereof are orthogonal to each other. In this system, convergence and divergence of light can be performed independently for two mutually-orthogonal components perpendicular to an optical axis, and thus it is possible to obtain images having different vertical and horizontal magnifications.

CITATION LIST

Patent Document

Patent Document 1: JP 2005-164881 A
Patent Document 2: JP 2010-015116 A
Patent Document 3: JP S57-204018 A
Patent Document 4: JP 6602942 B

SUMMARY OF INVENTION

Technical Problem

With a view to solving problems of the optical systems proposed in the Patent Documents 1 to 3, the inventor of the present application has proposed the invention described in Patent Document 4. This invention makes it possible to provide an optical system which has a large light-gathering power, and can be produced easily and inexpensively and also used for a medium or lager-size reflecting telescope or the like. This optical system comprises: a reflecting body M having a concave shape curved only in one direction; and a convex-shaped focusing body L having a cylindrical axis 22' extending in an x-axis direction, as shown in FIG. 10($a$), wherein the optical system is configured such that an optical symmetry axis passes through respective centers in a height direction of the reflecting body M and the focusing body L, as shown in FIG. 10($b$).

However, in this optical system, there is an area which is not effectively utilized, in each of the reflecting body M and the focusing body L. FIG. 1 is a diagram schematically shown a relationship among the reflecting body M, the focusing body L and optical paths in the optical system of the Patent Document 4. In FIG. 1, the intersection of the optical symmetry axis and the reflecting body M is defined as the origin O of x-y-z Cartesian coordinates, wherein the direction of the optical symmetry axis (i.e., an up-down direction in FIG. 1) is defined as a y-axis, a direction orthogonal to the y-axis and tangent to the curvature of the reflecting body M (i.e., a right-left direction in FIG. 1) being defined as an x-axis, and a direction orthogonal to the y-axis and the x-axis being defined as a z-axis.

Firstly, in FIG. 1, when the reflecting body M has a length which causes a ray among the rays of light reflected by the reflecting body M to have an optical path OPa' passing outside an optical path OPa connecting an edge La in a cylindrical axis direction (x-axis direction) of the focusing body L and a focus $y_{FM}$ of the reflecting body M, the ray on the optical path OPa' does not enter the focusing body L, so that it does not contribute to image formation. That is, in the reflecting body M configured to reflect light part of which passes outside the edge La, there is an area $M_1$ which is not effectively utilized. If it is tried to allow light reflected by the reflector M to entirely enter the focusing body L, the length of the reflecting body M has to be shorted as long as the positional relationship between the reflecting body M and the focusing body L will remain as it is, leading to reduction in the light-gathering power.

On the other hand, among parallel incident light rays from the object to the reflecting body M, a ray passing beside the edge La of the focusing body L and then reflected by the reflecting body M passes through a position Lb between the edge La and the center Lc in the cylindrical axis direction of the focusing body L. However, since the focusing body L itself blocks parallel incident light from the object, no reflected light from the reflecting body M enters an area $L_1$ of the focusing body L on the side of the center in the cylindrical axis direction with respect to an optical path OPb connecting a point Mb where a ray passing beside the edge La of the focusing body L is reflected by the reflecting body M, and the focus $y_{FM}$ of the focusing body L. Thus, in the focusing body L, there is an area $L_1$ which is not effectively utilized.

Further, the reflecting body M is normally formed by curving a single mirror plate only in one direction. In a concave-shaped reflecting body obtained by curving a single mirror plate, particularly formed inexpensively, it is difficult to match a curvature of a portion of the reflecting body from the center Mc to one $Me_1$ of opposite edges Me thereof and a curvature of a portion of the reflecting body from the center Mc to the other edge $Me_2$ thereof, with a high degree of accuracy. When the curvatures of the two portions are mismatched, a ray reflected by the portion from the center Mc to the one edge $Me_1$ and a ray reflected by the portion from the center Mc to the other edge $Me_2$ will become different in terms of a focal position on the y-axis. In order to match the curvatures of the two portions with a high degree of accuracy, extremely-high processing accuracy is required, and it is necessary to improve structural strength so as to prevent deformation during use. Therefore, the optical system illustrated in FIG. 1 becomes high in cost and becomes increased in weight, in addition to high difficulty in constructing a highly-accurate system.

A technical problem to be solved by the present invention is to provide an optical system also usable for a medium or larger-size reflecting telescope, wherein the optical system is configured to make it possible to utilize a reflecting body for reflecting light from an object, and a reflecting or focusing body for reflecting or transmitting light from the reflecting body to focus the light into a point focus, as effectively as possible, thereby attaining a large light-gathering power while producing a maximum light-gathering power easily and inexpensively with a minimum material.

Solution to Technical Problem

Consider an optical system which comprises: a first optical element having a concave shape curved only in one direction and configured to reflect and focus light from an object, into a linear focus; and a second optical element disposed between the first optical element and the linear focus and configured to transmit or reflect light reflected by the first optical element, thereby focusing the light into a point focus. Here, the intersection of an optical symmetry axis of this optical system and the first optical element is defined as the origin O of x-y-z Cartesian coordinates, wherein the direction of the optical symmetry axis is defined as a y-axis, a direction which is tangent to the curvature of the first optical element on a plane orthogonal to the y-axis being defined as an x-axis, and a direction orthogonal to the y-axis and the x-axis being defined as a z-axis. The present invention provides an offset optical system which comprises an optical element corresponding to at least part of either one (e.g., a portion equivalent to the left side of the y-axis in FIG. 1) of two optical system halves obtained by dividing the above optical system by a y-z plane. This offset optical system comprises: a primary mirror composed of at least part of one of the divided halves of the first optical element (an optical element half equivalent to one-half of the first optical element); and a sub-mirror, wherein the sub-mirror is disposed offset parallel to the x-axis by a given distance toward an edge of the primary mirror located distal to the y-axis. Although the sub-mirror may have the same size as that of the second optical element before the division, it is undesirable because as the length in an x-axis direction of the sub-mirror becomes longer, an area of the sub-mirror which hinders light from entering the primary mirror becomes wider, and the size of the primary mirror becomes larger, leading to increase in cost for system construction. Thus, it is preferable that the sub-mirror is also composed of at least part of one of divided halves of the second optical element (an optical element half equivalent to one-half of the second optical element), as in the primary mirror.

In other words, an offset optical system according to the present invention is characterized in that it comprises: a primary mirror composed of at least part of one of two optical element halves obtained by dividing an optical element having a concave shape curved only in one direction, in an intermediate position of a length along a curvature thereof, wherein the optical element is configured to reflect and focus light from an object, into a linear focus; a sub-mirror disposed between the primary mirror and the linear focus and configured to transmit or reflect light reflected by the primary mirror, thereby focusing the light into a point focus; wherein, when: a direction tangent to the curvature in the intermediate position of the optical element is defined as an x-axis; a direction which is perpendicular to the x-axis and in which the object is located is defined as a y-axis; and a direction orthogonal to the x-axis and the y-axis is defined as a z-axis, the sub-mirror is offset parallel to the x-axis by a given distance toward an edge of the primary mirror located distal to the y-axis.

Effect of Invention

The present invention makes it possible to construct an optical system with a large light-gathering power, while reducing useless portions of the primary and sub-mirrors as much as possible. In particular, when a cylindrical lens which is more expensive in many cases is used as the sub-mirror, it is possible to usefully and effectively utilize the entire area in a length direction of the cylindrical lens having the given length. Further, a reflecting mirror having a concave shape curved only in one direction is easy to polish, as compared to a parabolic reflecting mirror used for conventional reflecting telescopes. Thus, the present invention can provide an optical system configured to attain a large light-gathering power while producing a maximum light-gathering power easily and inexpensively with a minimum material.

For example, the optical system according to the present invention can facilitate weight reduction, so that it is possible to reduce curvature deformation of the reflecting mirror due to gravity, and thus simplify a support structure, which is advantageous for application to medium-size telescopes. Further, in the optical system according to the present invention, it is possible to easily produce the reflecting mirror using, e.g., a 3D printer or the like, and to save on a material used therefor, which is advantageous for application to a lightweight, compact, small-size telescope, e.g., for education or for toys.

DESCRIPTION OF EMBODIMENTS

With reference to the drawings, one embodiment of the present invention will now be described in detail.

Figure 10:
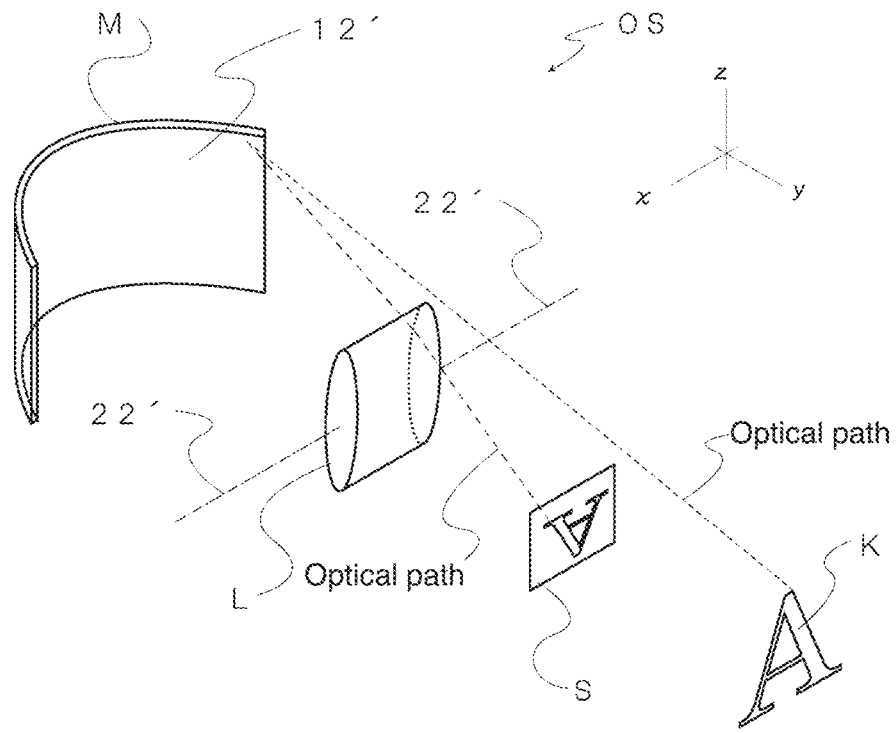
FIGS. 10(a) and 10(b) are schematic diagrams showing a conventional optical system.
Figure 10:
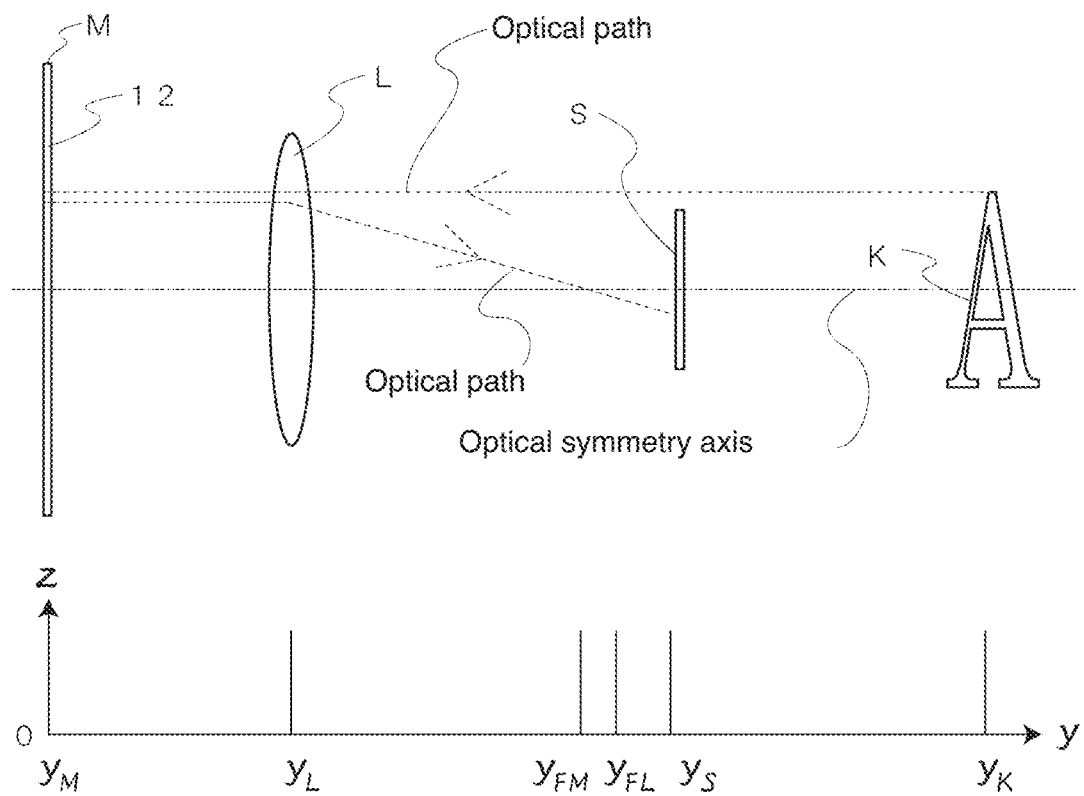

First of all, the configuration of a conventional optical system OS illustrated in FIG. 10 and and a design method therefor will be described below. For reference, a similar content to the following is also described in the Patent Document 4.

[Configuration of Conventional Optical System OS]

FIG. 10(a) is a schematic diagram showing the configuration of a conventional optical system OS. In FIG. 10(a), an x-axis, a y-axis and a z-axis are defined as shown in the figure. The optical system OS comprises a primary mirror M configured to reflect light from an object K, and a sub-mirror L configured to transmit light reflected by the primary mirror M. The optical system OS further comprises a screen S (light-receiving part) configured to receive light transmitted through the sub-mirror L.

In FIG. 10(b), the primary mirror M, the sub-mirror L and the screen S are arranged in a straight line on the y-axis. However, the optical system is not limited to such an arrangement, but may be configured, for example, such that the primary mirror M and the sub-mirror L are arranged on the y-axis, wherein light transmitted through the sub-mirror L is extracted laterally by using a diagonal mirror disposed on the y-axis, and then received by a screen S disposed on a lateral side of the y-axis.

(Primary Mirror M)

The primary mirror M has a reflecting surface 12' with a concave shape curved only in one direction, wherein the reflecting surface 12' is capable of reflecting light from the object K. The concave shape of the reflecting surface 12' may have, but not limited to, a parabolic cylindrical surface, an elliptic cylindrical surface, a circular cylindrical surface, a hyperbolic cylindrical surface, or the like. Among them, a parabolic cylindrical surface is preferable, from a viewpoint of being able to focus light into a linear focus on the y-axis, and free of aberrations. However, since, even if an aberration occurs due to the primary mirror, it can be absorbed by disposing a plurality of appropriately-selected correcting lenses, it is also relatively easy to employ a shape with any surface other than a parabolic cylindrical surface, as the concave shape of the reflecting surface 12'. In a primary mirror M whose reflecting surface 12' has a shape with a parabolic cylindrical surface, it can be produced, for example, by curving a single mirror plate along a parabola expressed as the equation $y=ax^2$ (where a is a constant)) such that a mirror surface of the mirror plate serving as the reflecting surface 12' will be on an inner side of the parabolic cylindrical surface. For example, in the primary mirror M curved along the parabola expressed as the equation $y=ax^2$, the focus of the parabola is at a y-axial position of $1/(4a)$. Thus, assuming that the screen S in FIG. 10(a) is disposed at the position of the focus of the primary mirror M, the constant a can be determined from that position to design the shape of the reflecting surface 12' of the primary mirror M.

The primary mirror M can focus light reflected by the concave-shaped reflecting surface 12', into a linear focus. Here, the shape of a portion of the primary mirror M on the side opposite to the reflecting surface 12' is not particularly limited. For example, when realizing a telescope using this optical system OS, the primary mirror M may be fixed to the inside of a lens barrel constituting the telescope.

The size of the primary mirror M is not particularly limited, but may be appropriately determined depending on a distance from an object and other conditions such as a required light-gathering power. A material usable as the reflecting surface 12' of the primary mirror M is not particularly limited, but is preferably less likely to deform due to thermal expansion and easy to be processed. Specifically, aluminum, stainless steel, glass, resin or the like can be appropriately use, depending on an intended purpose and other conditions such as an acceptable weight. When using glass or resin, the reflecting surface 12' can be formed by using such a material as a substrate, and vapor-depositing a metal on or attaching a mirror plate to a surface of the substrate. The reflecting surface 12' can also be fabricated based on a die formed using a general-purpose numerically-controlled machine tool. The primary mirror M may be made of a shape-memory alloy. In this case, for example, the primary mirror M wound into roll form can be placed on a rocket, and after being carried to a satellite orbit, deployed on the orbit, thereby constructing a giant space telescope.

(Sub-Mirror)

The sub-mirror L may be a convex-shaped cylindrical lens having a cylindrical axis 22' parallel to an x-axis direction, wherein the cylindrical lens is disposed between the primary mirror M and the linear focus of the primary mirror M, in a y-axis direction. The sub-mirror L is disposed such that the direction of the cylindrical axis 22' (parallel to the x-axis direction) is orthogonal to a direction (y-axial direction) orthogonal to a tangent along a curvature of the primary mirror M in an intermediate position in a length direction of the primary mirror M, so that it can focus light reflected by the primary mirror M into a point focus by transmitting the light therethrough.

The shape of the sub-mirror L is not particularly limited, but a plano-convex-shaped cylindrical lens having a first side surface facing the reflecting surface 12' of the primary surface M and a second side surface on the side opposite to the first side surface, wherein the first side surface is composed of a flat surface, and the second side surface is composed of a convex surface, or a biconvex-shaped cylindrical lens having a first side surface facing the reflecting surface 12' of the primary surface M and a second side surface on the side opposite to the first side surface, wherein each of the first and second side surfaces is composed of a convex surface, may be appropriately selected and used, depending on a required focal length. When it is required to increase the focal length, the plano-convex-shaped cylindrical lens is preferably used, and when it is required to reduce the focal length, the biconvex-shaped cylindrical lens is preferably used. Further, a lens having a cylindrical Fresnel surface may be used as the sub-mirror L. In this case, it becomes possible to produce a large-size telescope more lightly in weight and inexpensively. For example, when realizing a telescope using this optical system, it is preferable that the sub-mirror L is movably supported on a rail installed inside the lens barrel to extend in an optical-axis direction.

The number of the sub-mirror L is not limited to one, but may be two or more. For example, depending on the shape of the reflecting surface 12' of the primary mirror M, the intended purpose of a finally necessary image, etc., a group of cylindrical lens $L_1$-$L_n$ can be arranged on the y-axis as a sub-mirror, and configured such that light transmitted through the lens $L_n$ most distal from the primary mirror M is focused into a point focus.

When the sub-mirror is used in the form of the group of cylindrical lens $L_1$-$L_n$, the group of cylindrical lens $L_1$-$L_n$ may consist only of plural plano-convex-shaped cylindrical lenses, or of plural biconvex-shaped cylindrical lenses, or may be any appropriate combination of one or more plano-convex-shaped cylindrical lenses and one or more biconvex-shaped cylindrical lenses.

Further, in addition to the plural plano-convex-shaped cylindrical lenses, the plural biconvex-shaped cylindrical lens, or the combination of one or more plano-convex-shaped cylindrical lenses and one or more biconvex-shaped cylindrical lenses, the group of cylindrical lens $L_1$-$L_n$ may include one or more plano-concave-shaped cylindrical lenses, one or more biconcave-shaped cylindrical lenses, or a combination thereof. In this case, each of the one or more plano-concave-shaped cylindrical lenses and/or the one or more biconcave-shaped cylindrical lenses is disposed such that the direction of cylindrical axis thereof becomes parallel to the one or more plano-convex-shaped cylindrical lenses and/or the one or more biconvex-shaped cylindrical lenses (i.e., to the x-axis direction).

The size of the sub-mirror L is not particularly limited, but is preferably reduced as much as possible, from a viewpoint of a reduction in weight and cost. The height (length in a z-axis direction) of the sub-mirror L can be set depending on the height (length in the z-axis direction) of the primary mirror M. The material of the sub-mirror L is not particularly limited, but glass or resin may be appropriately used depending on an intended purpose and other conditions such as an acceptable weight.

(Screen)

The screen S is disposed downstream of the sub-mirror L in a traveling direction of light transmitted through the sub-mirror L, and can receive the light transmitted through the sub-mirror L. In FIG. 10(a), the screen S is used as one example of a light-receiving part. However, the light-receiving part is not limited thereto, but may be composed of an image pickup device such as CCD or CMOS, an eyepiece lens or the like, disposed at the position of the screen S. For example, when realizing a telescope using this optical system, it is preferable that the screen S is movably supported on a rail installed inside the lens barrel to extend in the optical-axis direction.

[Design of Conventional Optical System OS]

Next, a method of designing the conventional optical system OS will be described. FIG. 10(b) is a diagram of the optical system of FIG. 10(a) when viewed in the x-axis direction, wherein an axis extending in a right-left direction of the figure is the y-axis, and an axis extending in an up-down direction of the figure is the z-axis. In FIG. 10(b), on the assumption that the position of the intersection of the reflecting surface and a tangent to the curvature of the primary mirror M in an intermediate position in a height direction and a length direction of the primary mirror M is defined as an origin O, a relationship among respective y-axial positions of the sub-mirror L, the screen S and the object K, the y-axial position $y_{FM}$ of the focus of the primary mirror M, and the y-axial position $y_{FL}$ of the focus of the sub-mirror L is shown. Here, in order to design the optical system OS, when using two mirrors each having a certain focal length as the primary mirror M and the sub-mirror L, it is necessary to set the y-axial position $y_L$ of the sub-mirror L and the y-axial position $y_S$ of the screen S, with respect to the y-axial position $y_K$ of the object K.

Parallel incident light emitted from a distal object K and entering the primary mirror M in a direction from right to left in FIG. 10(b) is reflected by the concave-shaped reflecting surface 12' (surface curved along a parabola expressed as the equation $y=ax^2$) of the primary mirror M. The reflected light will be focused into a linear focus extending in the z-axis direction, at the y-axial position $y_{FM}=1/(4a)$ of the focus of the parabola expressed as the equation $y=ax^2$. When the sub-mirror L is disposed at the y-axial position $y_L$ between the above linear focus and the reflecting surface 12', light from the reflecting surface 12' is contracted in the z-axis direction by the sub-mirror L and focused into a point focus at the y-axial position $y_{FL}$.

Here, when the x-axial position of a point at which an optical path connecting the y-axial position $1/(4a)$ of the focus of parallel incident light rays reflected by the primary mirror M and an edge of the sub-mirror L, a distance between the sub-mirror L and the focus of the primary mirror M, (=focal length of the sub-mirror L), and a distance between the y-axis and an edge of the sub-mirror L (=½ of a length of the sub-mirror L parallel to the cylindrical axis thereof) are denoted, respectively, by x', f, and $\alpha$, $\alpha/f=x'/(1/4a)$ is satisfied. Thus, x' is expressed as follows: x'=a/4af. Therefore, in order to enhance the light-gathering power, x' will be increased, and in order to increase x', the primary mirror M and the sub-mirror L will be designed to make a and f smaller, and make a larger.

Generally, in a case where a convex lens having a focal length f is used, and an object is placed at a position farther than the focal length f of the convex lens, the magnification m of the convex lens is expressed by the following Equation (1):

$$m = \frac{b}{a} = \frac{b-f}{f}, \tag{1}$$

where a denotes a distance from the object to the convex lens, and b denotes a distance from the convex lens to an image. According to this magnification calculation, when the primary mirror M and the sub-mirror L are arranged as shown in FIG. 10(b), the magnification mx in the x-direction can be expressed by the following Equation (2), using the y-axial position $y_M$ (=0) of the primary mirror M, the y-axial position $y_S$ of the screen S, the y-axial position $y_K$ of the object K, and the y-axial position $y_{FM}$ of the focus of the primary mirror M:

$$m_x = \frac{y_S}{y_K} = \frac{(y_S - y_{FM})}{y_{FM}} \quad (2)$$

Further, the magnification $m_z$ in the z-direction can be expressed by the following Equation (3), using the y-axial position $y_L$ of the sub-mirror L, the y-axial position $y_S$ of the screen S, the y-axial position $y_K$ of the object K, and the y-axial position $y_{FL}$ of the focus of the sub-mirror L:

$$m_z = \frac{(y_S - y_L)}{(y_K + y_L)} = \frac{\{(y_S - y_L) - (y_{FL} - y_L)\}}{(y_{FL} - y_L)} \quad (3)$$

From Equations (2) and (3), the following Equation (4) is derived:

$$y_s(y_K) = \frac{y_L^2 + y_{FL}y_K}{2y_L + y_K - y_{FL}} = \frac{y_{FM}y_K}{y_K - y_{FM}} \equiv A(y_K) \quad (4)$$

Here, when the focal length of the sub-mirror L is denoted by f, the y-axial position $y_{FL}$ of the focus of the sub-mirror L is expressed as $y_{FL}=y_L+f$. Thus, the left-hand side of Equation (4) can be transformed into the following Equation (5):

$$\frac{y_L^2 + y_{FL}y_K}{2y_L + y_K - y_{FL}} = \frac{y_L^2 + (y_L + f)y_K}{2y_L + y_K - (y_L + f)} = \frac{y_L^2 + (y_L + f)y_K}{y_L + y_K - f} \equiv A(y_K) \quad (5)$$

Then, Equation (5) can be rearranged for $y_L$, to obtain the following Equation (6):

$$y_L^2 + y_L(y_K - A) + y_K(f - A) + Af = 0 \quad (6)$$

Further, from Equation (6), yL can be derived as the following Equation (7):

$$y_L = \frac{1}{2}\left\{A - y_K \pm \sqrt{(y_K - A)^2 - 4(y_K f - y_K A + Af)}\right\} \quad (7)$$

When restoring A in Equation (7) by using Equation (4), the following Equation (8) is obtained:

$$y_L(y_K) = \frac{1}{2}\left\{\frac{2y_{FM} - y_K}{y_K - y_{FM}}y_K + \sqrt{\left(\frac{y_K - 2y_{FM}}{y_K - y_{FM}}\right)^2 y_K^2 - 4fy_K + 4\left(\frac{y_{FM}y_K}{y_K - y_{FM}}\right)(y_K - f)}\right\} \quad (8)$$

(Note that, in Equation (8), only positive sign is used in order to conform to reality.)

Here, the following approximate expression holds when x is quite smaller than 1:

$$(1 + x)^{1/2} \approx 1 + \frac{x}{2}$$

Then, the above approximate expression can be used to derive the following Expression (9) when the object K is located at a quite distant position ($y_K \gg y_{FM}$):

$$y_L \approx y_{FM} - f \quad (9)$$

That is, the position of the sub-mirror L is determined only by the y-axial position $y_{FM}$ of the focus of the primary mirror M and the focal length f of the sub-mirror L, without depending on the position of the object K. Further, when the object K is located at a quite distant position, the incident light consists of parallel rays. Thus, in order to allow an image to appear on the screen S, the following Expression (10) must be satisfied:

$$y_S \approx y_{FM} \quad (10)$$

[Configuration of Offset Optical System OSS According to Present Invention]

Next, the configuration of an offset optical system according to the present invention and a method of deriving an offset amount of a sub-mirror of the offset optical system according to the present invention will be described.

In the conventional optical system OS illustrated in FIGS. 10(a) and 10(b), there is an area which is not effectively utilized, in each of the primary mirror M and the sub-mirror L, and a system using a concave-shaped primary mirror M obtained by curving a single mirror plate has high difficulty in constructing a highly-accurate system, and becomes increased in cost and weight, as described in this Description in connection with the technical problem to be solved by the present invention.

In this context, the present inventor has invented a new optical system capable of solving such a technical problem. This optical system OOS will hereinafter be referred to as "offset optical system OOS".

Figure 2:
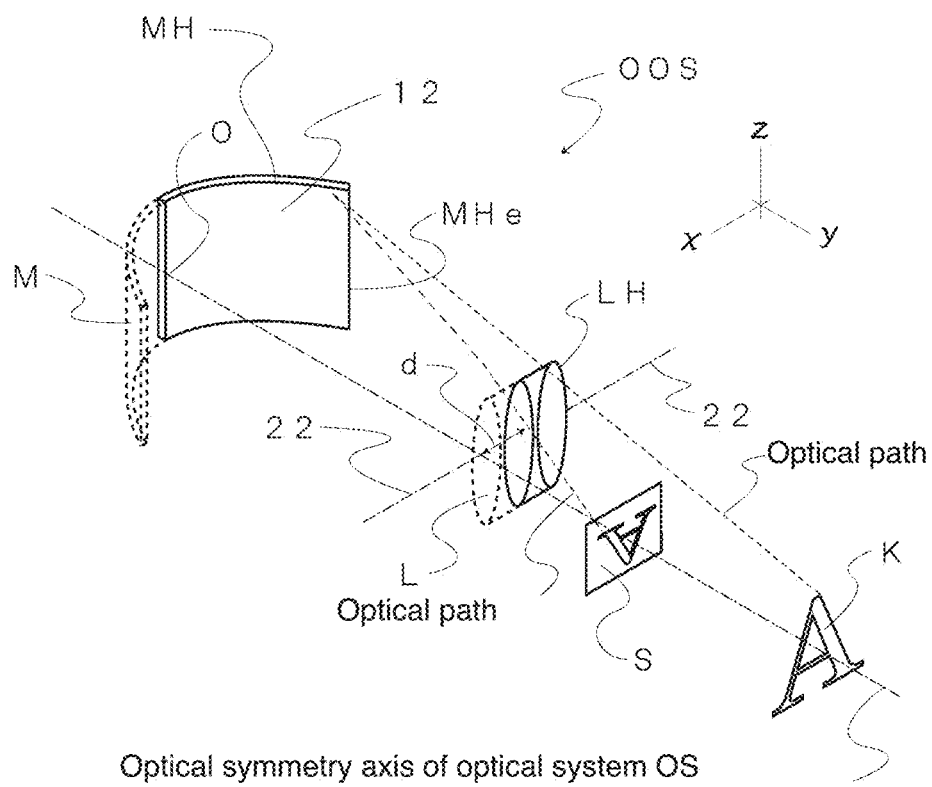
FIG. 2 is a schematic diagram showing an offset optical system according to one embodiment of the present invention.
Figure 3:
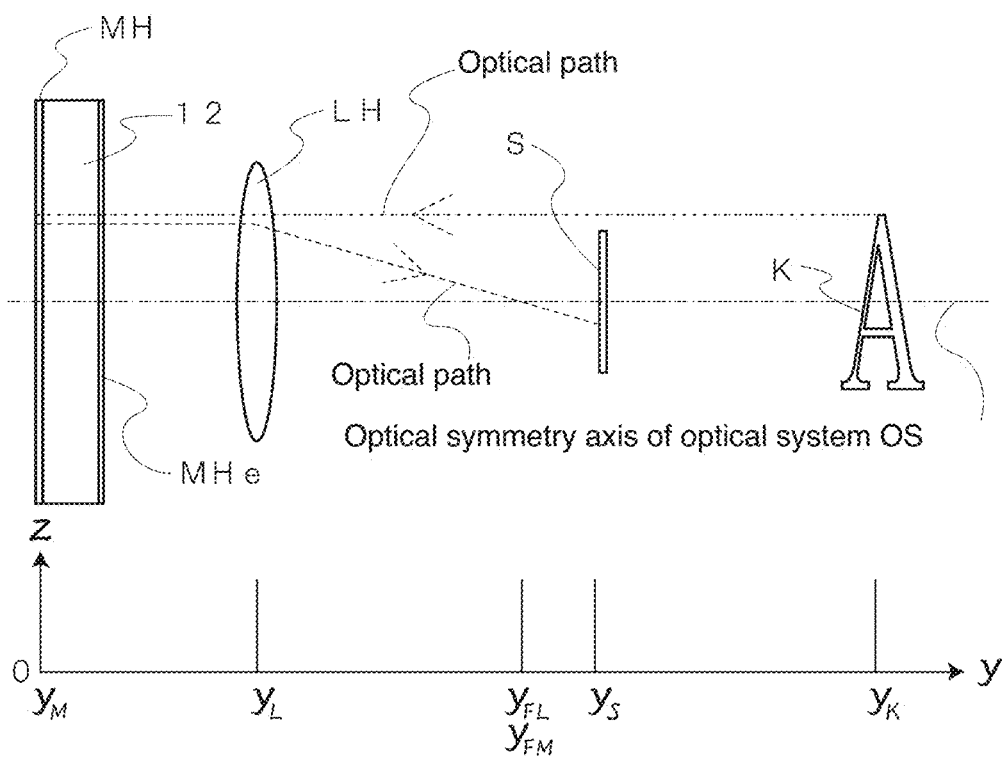
FIG. 3 is a schematic diagram of the offset optical system in FIG. 2, when viewed in an x-axis direction, wherein it shows, in Cartesian coordinates whose origin is set at the position of a primary mirror, a relationship among respective positions of a sub-mirror, a screen and an object, and respective positions of the focus of the primary mirror and the focus of the sub-mirror.

FIG. 2 is a schematic diagram showing the configuration of an offset optical system OOS according to one embodiment of the present invention, wherein an x-axis, a y-axis and a z-axis are are defined as shown in the figure. FIG. 3 is a schematic diagram of the offset optical system OOS when viewed in an x-axis direction, wherein it shows, in Cartesian coordinates whose origin O is set at the position of the after-mentioned primary mirror MH, a relationship among respective positions of the after-mentioned sub-mirror LH, screen S and object K, and respective positions $y_{FM}$, $y_{FL}$ of the focus of the primary mirror MH and the focus of the sub-mirror LH.

The offset optical system OOS comprises a primary mirror MH, a sub-mirror LH and a screen S each indicated by a solid line in FIG. 2, wherein it is configured to reflect light from a distal object K by the primary mirror MH, and transmit the reflected light through the sub-mirror LH, thereby allowing an image of the object K to be formed onto the screen S. It should be noted that although incident light on the primary mirror MH in FIG. 2 is not illustrated as parallel incident light, this is because the position of the object K is depicted near the offset optical system OOS for the sake of convenience of illustration. In FIG. 2, two dotted line parts are depicted together, respectively, with the primary mirror MH and the sub-mirror LH each indicated by a solid line. Here, the entirety of the primary mirror MH indicated by a solid line and the corresponding dotted line part represents the primary mirror M in the conventional optical system OS, and the entirety of the sub-mirror LH indicated by a solid line and the corresponding dotted line part represents the sub-mirror L in the conventional optical system OS. The offset optical system OOS has a configuration in which each of the primary mirror M and the sub-mirror L in the conventional optical system OS is divided into two halves along a y-z plane passing through an optical symmetry axis of the conventional optical system OS, and optical element halves comprised in one of the halves of the conventional optical system OS, i.e., a reflecting body and a focusing body, are used, respectively, as the primary mirror MH and the sub-mirror LH, wherein the sub-mirror LH is disposed offset parallel to the x-axis (i.e., along the cylindrical axis 22) by a given d distance toward an edge MHe of the primary mirror MH located distal to the y-axis.

Figure 1:
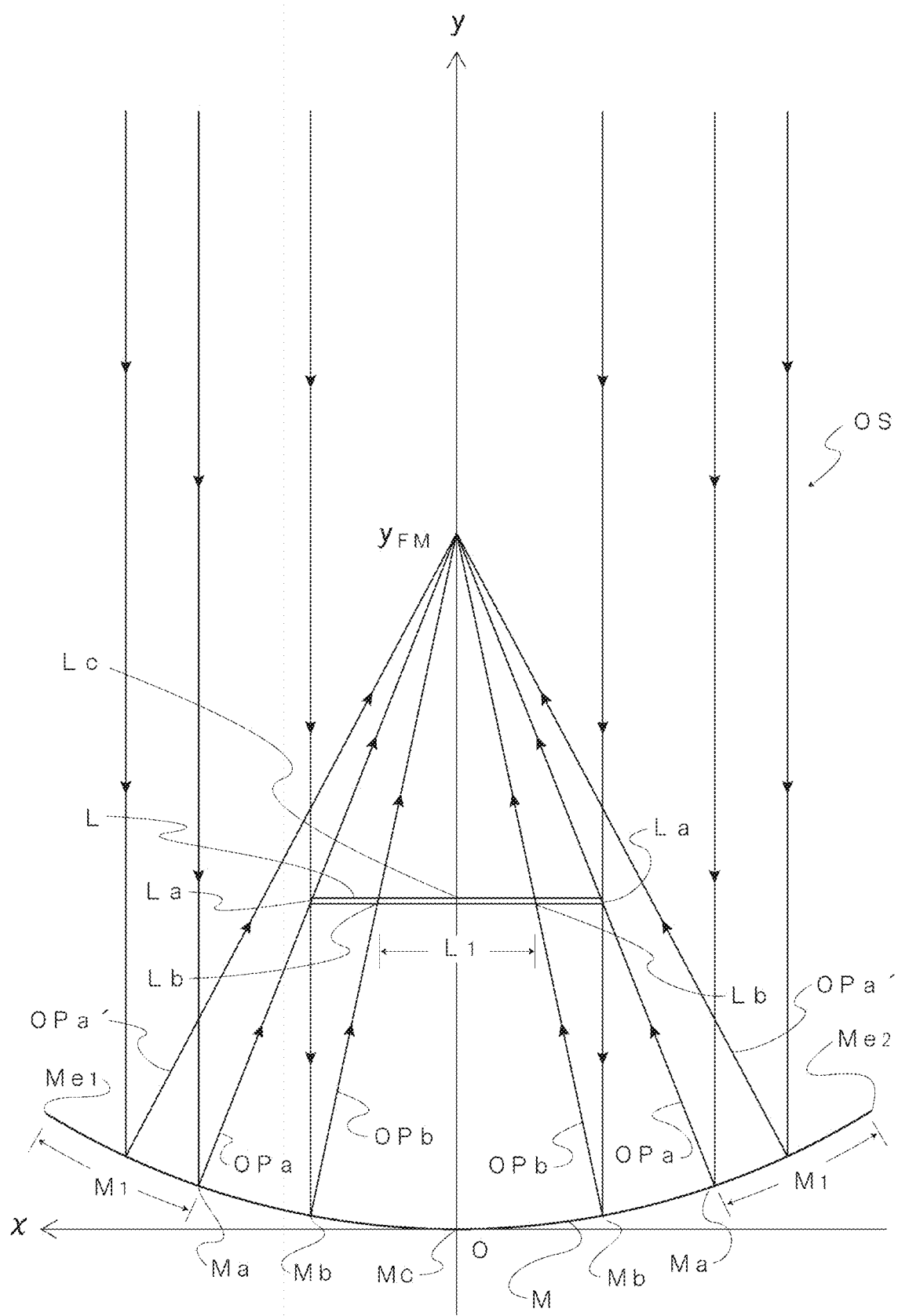
FIG. 1 is a diagram showing a relationship among a reflecting body, a focusing body and optical paths in a conventional optical system.

The primary mirror MH has a concave-shaped reflecting surface 12, and is capable of focusing light reflected by the reflecting surface 12 into a linear focus. The primary mirror MH may be composed of one of two optical element halves obtained by dividing the primary mirror M in an intermediate position of a length along a curvature thereof, and physical properties thereof, except for being divided into halves, are the same as those of the primary mirror M. The details of the primary mirror M are as described in connection with the configuration of the conventional optical system OS. There are the following advantages by using part of the primary mirror M, instead of using the entirety of the primary mirror M. As described above in connection with FIG. 1, in the conventional optical system using the entirety of the primary mirror M, there is inevitably an area which is not effectively utilized, in the sub-mirror L (area $L_1$ illustrated in FIG. 1). In contrast, using, as the primary mirror MH, at least a part of one of two optical element halves obtained by dividing the primary mirror M makes it possible to introduce a new technical idea, called "offset", thereby eliminating a useless portion of the sub-mirror to effectively utilize the entirety of the sub-mirror. Further, it is possible to reduce the cost and weight of the primary mirror MH, and save on a material used therefor.

The sub-mirror LH may be composed of a convex-shaped cylindrical lens having a cylindrical axis 22 extending parallel to the x-axis, and disposed between the primary mirror MH and the linear focus of the primary mirror MH in a y-axis direction. The sub-mirror LH may be composed of one of two optical element halves obtained by dividing the sub-mirror L in an intermediate position in a cylindrical axis direction, and physical properties thereof are the same as those of the sub-mirror L. The details of the sub-mirror L are as described in connection with the configuration of the conventional optical system OS. The screen S is disposed downstream of the sub-mirror LH in a traveling direction of light transmitted through the sub-mirror LH, and can receive the light transmitted through the sub-mirror LH. The details of the screen S are also as described in connection with the configuration of the conventional optical system OS.

[Method of Deriving Offset Amount in Offset Optical System According to Present Invention]

Figure 4:
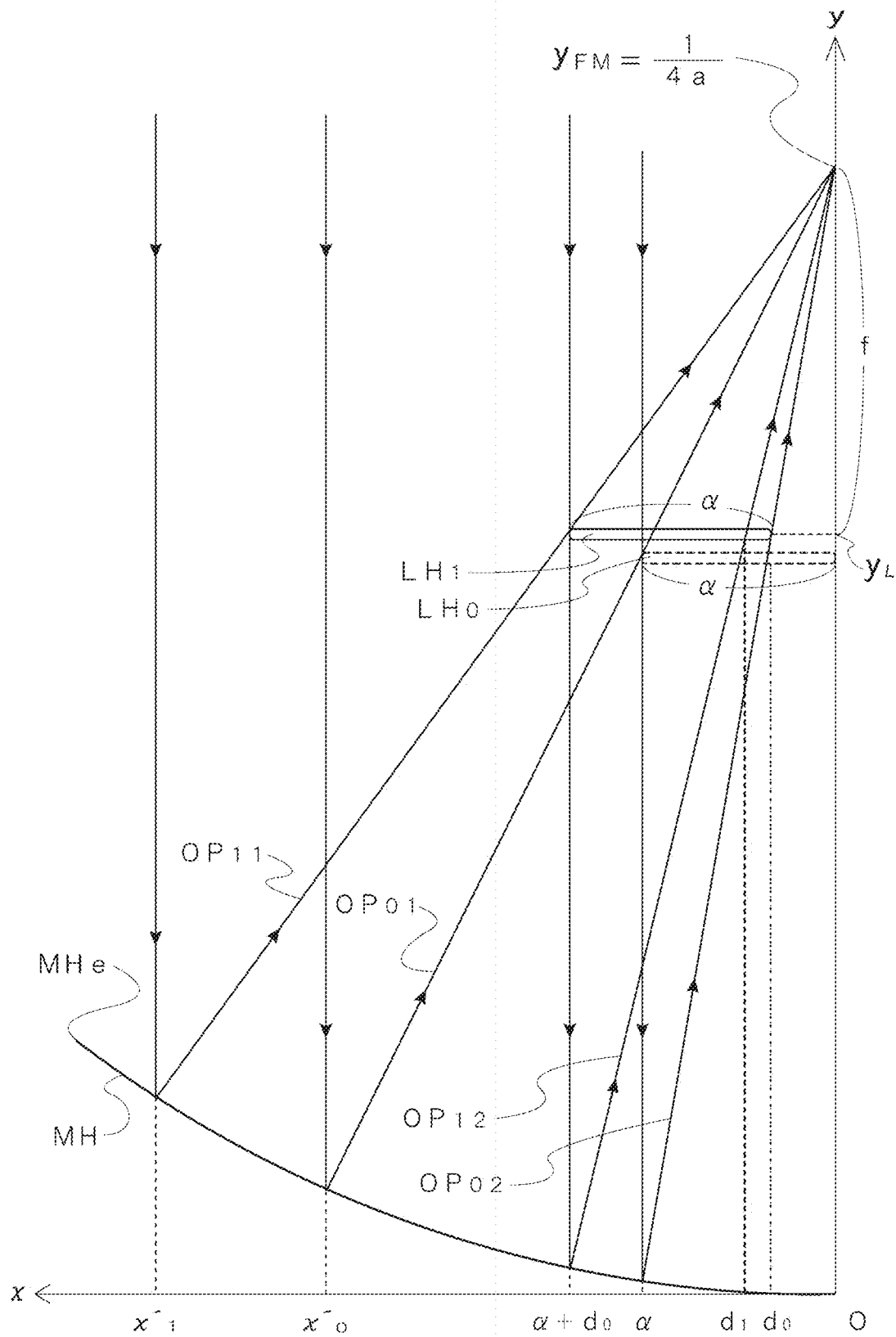
FIG. 4 is a schematic diagram for explaining a method of deriving an offset amount in the offset optical system according to the above embodiment, when viewed in a z-axis direction.

Here, a method of deriving an offset amount d which is a given distance by which the sub-mirror LH is offset parallel to the x-axis toward the edge MHe of the primary mirror MH located distal to the y-axis will be described. FIG. 4 is a schematic diagram for explaining a method of deriving the offset amount d in the offset optical system OSS when viewed in a z-axis direction.

In FIG. 4, one of two optical element halves obtained by dividing the primary mirror M of the optical system OS is defined as a primary mirror MH, and one of two optical element halves obtained from the sub-mirror M in a similar manner is defined as a sub-mirror $LH_0$. Then, the sub-mirror $LH_0$ is displaced parallel to the x-axis by a distance do in a direction away from the y-axis (i.e., in a direction toward the edge MHe of the primary mirror MH), and the resulting sub-mirror is defined as a sub-mirror $LH_1$. It should be noted that in FIG. 4, the sub-mirror $LH_0$ and the sub-mirror $LH_1$ are depicted such that they are mutually displaced in the y-axis direction. However, this is because of facilitating the reading of the drawing, and their y-coordinates are actually the same.

Given that the primary mirror MH has a parabolic cylindrical surface expressed as the equation $y=ax^2$, the x-axial position of a point at which an optical path $OP_{01}$ connecting the y-axial position $y_{FM}$ (=1/4a) of a focus of the primary mirror MH and a left edge of the sub-mirror $LH_0$ intersects the primary mirror MH is denoted by $x'_0$, as shown in FIG. 4. That is, reflected light as a part of parallel incident light reflected at a position on the primary mirror MH corresponding to the x-axial position $x'_0$ passes beside the left edge of the sub-mirror $LH_0$. When a distance between the y-axial position $y_{FM}$ of the focus of the primary mirror MH and the sub-mirror $LH_0$ (i.e., a focal length of the sub-mirror LH) is denoted by f, and the length of the sub-mirror $LH_0$ (a distance between an edge of the sub-mirror $LH_0$ farthest from the y-axis and an edge of the sub-mirror $LH_0$ nearest to the y-axis) is denoted by $\alpha$, 1/4a: f=$x'_0$: $\alpha$, and thus $x'_0=\alpha/4af$. In this case, a portion of the primary mirror MH located outside $x'_0$ (located far away from the y-axis) becomes an unutilized or useless area.

Further, when the x-axial position corresponding to a point at which an optical path $OP_{02}$ of reflected light as a part of parallel incident light rays passing outside and beside the left edge of the sub-mirror $LH_0$ and then reflected at a position on the primary mirror MH corresponding to the x-axial position $\alpha$ intersects the sub-mirror $LH_0$ is denoted by $d_0$, 1/4a: f=$\alpha$:$d_0$, and thus $d_0=4af\alpha$. In this case, since the sub-mirror $LH_0$ blocks parallel incident light, a portion of the sub-mirror $LH_0$ located inside the optical path $OP_{02}$ (on the side of the y-axis with respect to the optical path $OP_{02}$) becomes an unutilized or useless area through which no reflected light from the primary mirror MH is transmitted.

Here, the sub-mirror $LH_0$ is displaced parallel to the x-axis by the length do of the unutilized portion of the sub-mirror $LH_0$ in a direction away from the y-axis, and the resulting sub-mirror at the displaced position is defined as a sub-mirror $LH_1$. As with the sub-mirror $LH_0$, when in the sub-mirror $LH_1$, the x-axial position corresponding to a point at which an optical path $OP_{11}$ connecting the y-axial position $y_{FM}$ of the focus of the primary mirror MH and the left edge of the sub-mirror $LH_1$ intersects the primary mirror MH is denoted by $x'_1$, and the x-axial position corresponding to a point at which an optical path $OP_{12}$ of reflected light as a part of parallel incident light rays passing outside and beside the left edge of the sub-mirror $LH_1$ and then reflected at a position on the primary mirror MH corresponding to the x-axial position $\alpha+d_0$ intersects the sub-mirror $LH_1$ is denoted by $d_1$, $x'_1$ and $d_1$ are expressed as follows:

$$x'_1 = \frac{\alpha + d_0}{4af} = \frac{\alpha}{4af}(1 + 4af)$$

$$d_1 = 4af(\alpha + d_0) = 4af\alpha(1 + 4af)$$

Even in the sub-mirror $LH_1$, a portion of the primary mirror MH located outside the x-axial position $x'_1$ and a portion of the sub-mirror LH located inside the optical path $OP_{12}$ are unutilized or useless areas. Thus, consider a sub-mirror $LH_2$ (not illustrated) which is further displaced parallel to the x-axis by the length $d_1$ of the unutilized portion of the sub-mirror $LH_1$ in a direction away from the y-axis. When the x-axial position corresponding to a point at which an optical path connecting the y-axial position $y_{FM}$ of the focus of the primary mirror MH and the left edge of the sub-mirror $LH_2$ intersects the primary mirror MH is denoted by $x'_2$ (not illustrated), and the x-axial position corresponding to a point at which an optical path of reflected light as a part of parallel incident light rays passing outside and beside the left edge of the sub-mirror $LH_2$ and then reflected at a position on the primary mirror MH corresponding to the x-axial position $\alpha+d_1$ (not illustrated) intersects the sub-mirror $LH_2$ is denoted by $d_2$ (not illustrated), $x'_2$ and $d_2$ are expressed as follows:

$$x'_2 = \frac{\alpha}{4af}\{1 + 4af + (4af)^2\}$$

$$d_2 = 4af\alpha\{1 + 4af + (4af)^2\}$$

If the operation of displacing the sub-mirror parallel to the x-axis in the above manner is repeated n times, each of x'n and dn becomes the sum of geometric series with a common ratio of 4af, and x'n and dn are expressed as follows:

$$x'_n = \frac{\alpha}{4af}\{1 + 4af + (4af)^2 \ldots + (4af)^n\} = \frac{\alpha}{4af} \cdot \frac{1-(4af)^n}{1-4af} \quad (11)$$

$$d_n = 4af\alpha\{1 + 4af + (4af)^2 \ldots + (4af)^n\} = 4af\alpha\frac{1-(4af)^n}{1-4af} \quad (12)$$

In this optical system, since 1/4a is greater than f, 4af is less than 1. Thus, when the displacement of the sub-mirror LHn is repeated infinitely, i.e., n→∞, Equations (11) and (12) are expressed as follows:

$$x'_\infty = \frac{\alpha}{4af} \cdot \frac{1}{1-4af} \quad (13)$$

$$d_\infty = 4af\alpha\frac{1}{1-4af} \quad (14)$$

Figure 5:
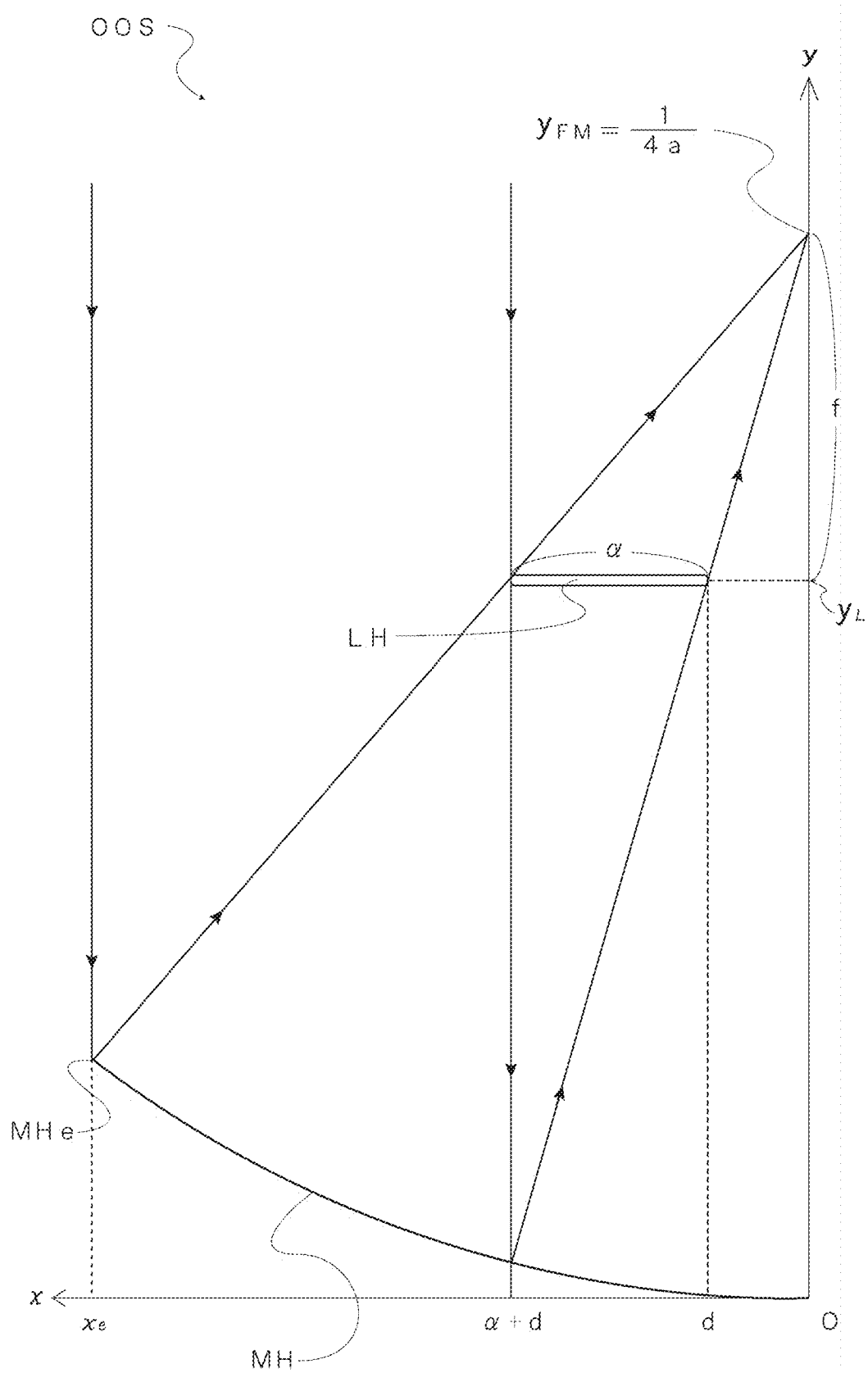
FIG. 5 is a schematic diagram of the offset optical system according to the above embodiment, when viewed in the z-axis direction.

Therefore, an optical system usefully and effectively utilizing the entire area of the sub-mirror LH having a length a can be designed by determining $d_\infty$ from Equation (14), and using $d_\infty$ as an amount d by which the sub-mirror LH is offset. Further, an optical system free of a useless area around an edge MHe of the primary mirror MH having difficulty in ensuring optical accuracy can be designed by determining $x'_\infty$ from Equation (13), and setting an x-axial position $x_c$ corresponding to $x'_\infty$, as the position of the edge MHe of the primary mirror MH. A schematic top view of the offset optical system OOS designed in the above manner is shown in FIG. 5.

The offset optical system OOS can be designed as an optical system free of a useless area around an edge of a primary mirror MH. On the other hand, as shown in FIG. 5, a portion of the primary mirror MH located between a position corresponding to the x-axial position d and the origin O substantially becomes a useless area, because no reflected light from the primary mirror MH enters the sub-mirror LH. Further, a portion of the primary mirror MH located between a position corresponding to the x-axial position α+d and the position corresponding to the x-axial position d also becomes a useless area, because it is hidden behind the sub-mirror LH and thus no parallel incident light reaches there. Thus, a primary mirror MH prepared by preliminarily removing the above useless area therefrom, i.e., at least part of one of two optical element halves obtained by dividing the primary mirror M in an intermediate position of the length along the curvature thereof, may be used. In this case, it becomes possible to further reduce the weight and cost of the primary mirror MH, and further save on a material used therefor.

Further, the primary mirror M (i.e., the reflecting body M composed of the entirety of the solid line part and the dotted line part in FIG. 2) from which the primary mirror M is produced has been described based on an example in which it has a parabolic cylindrical surface. However, in a region of paraxial rays, a similar explanation is also applied to a hyperbolic cylindrical surface, an elliptic cylindrical surface, and a circular cylindrical surface, as well as a parabolic cylindrical surface. The region of paraxial rays means a region in which the following equation is satisfied: sin θ=θ, where θ denotes an angle between the optical axis of the primary mirror and the optical path of the reflected light. In this region, it can be normally considered that each of a parabolic cylindrical surface, a hyperbolic cylindrical surface and an elliptic cylindrical surface has the same curvature radius r as that of a circular cylindrical surface, and the focal length thereof is approximately equal to the focal length (1/4a) of a parabolic cylindrical surface. In this case, the focal length of the primary mirror can be expressed as r/2, i.e., expressed as follows:

$$\frac{1}{4a} \approx \frac{r}{2}$$

Thus, the x-axial position of the edge of the primary mirror distal to the y-axis and the offset amount of the sub-mirror can be set using the curvature radius r by replacing 4a with 2/r in Equations (13) and (14).

Figure 6:
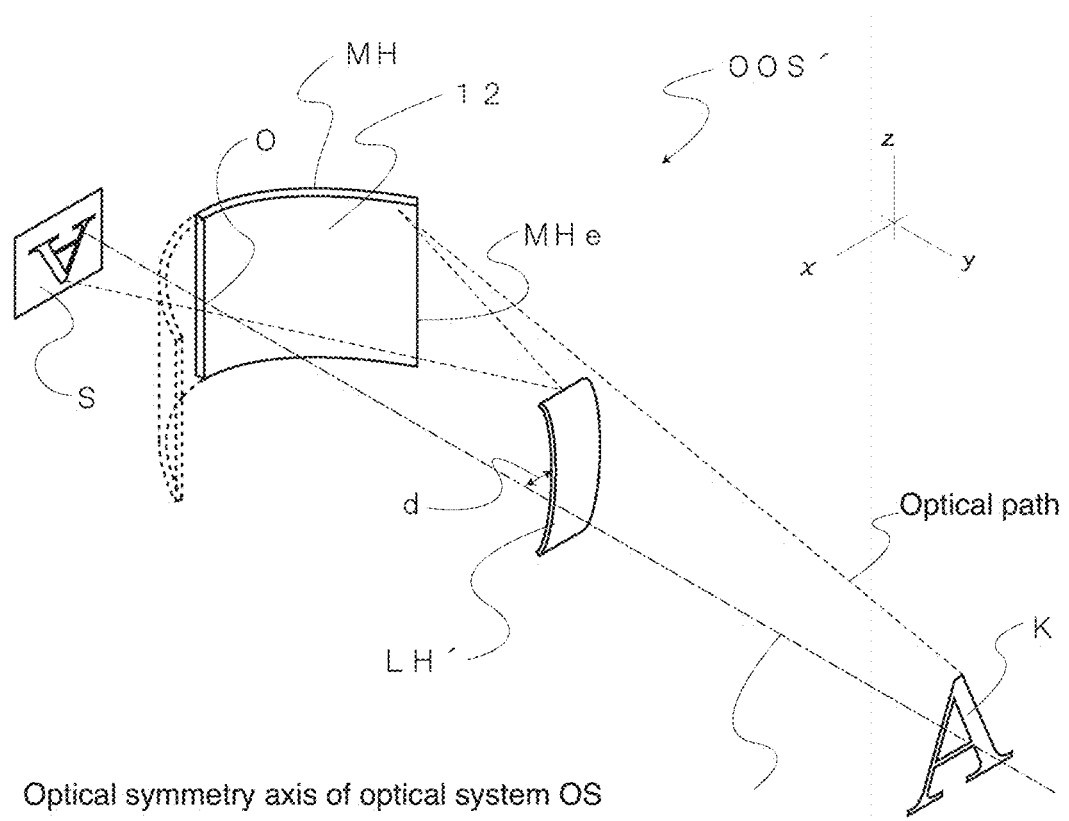
FIG. 6 is a schematic diagram showing an offset optical system according to another embodiment of the present invention.

Instead of a focusing body such as a cylindrical lens, the sub-mirror may be composed of a reflecting body having a concave-shaped reflecting surface curved only in one direction as with the primary mirror MH. FIG. 6 illustrates an offset optical system OOS' according to another embodiment of the present invention, wherein a concave-shaped reflecting body curved only in one direction is used as a sub-mirror LH'. As with the offset optical system OOS, this offset optical system OOS' can be designed as an optical system capable of usefully and effectively utilizing the entire area of the sub-mirror LH' by using $d_\infty$ determined from Equation (14) as the offset amount d, and displacing the sub-mirror LH' parallel to the x-axis by this amount d in a direction away from the y-axis. Here, the sub-mirror LH' may be configured to be rotated about a line which is tangent to a height-directional midpoint thereof and extends in the z-axis direction, or rotated about an axis line passing through the height-directional midpoint and extending in the x-axis direction, so as to direct reflected light in an arbitrary direction. Thus, the screen S may be disposed, e.g., on one of the right, upper and lower sides of the primary mirror MH in FIG. 6.

Figure 7:
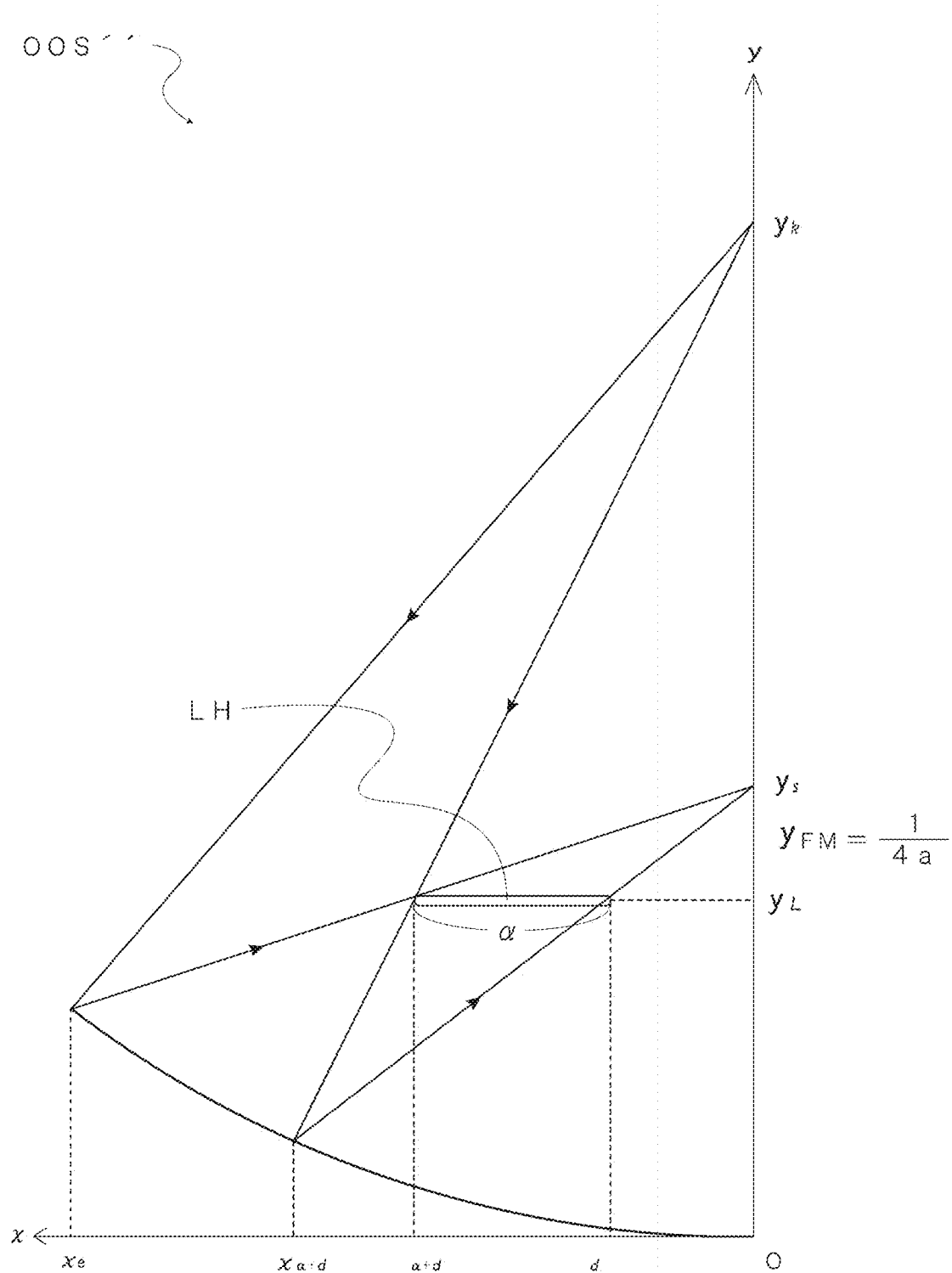
FIG. 7 is a schematic diagram showing an offset optical system according to yet another embodiment of the present invention, wherein a distance to an object is close.

The above description has been made about the offset optical system OOS in the case where the object K is located far away therefrom. On the other hand, in a case where a distance to an object K is close, incident light from the object K to the primary mirror MH is not parallel incident light. Thus, the x-axial position of the edge of the primary mirror MH and the offset amount are different from those in the offset optical system OOS. FIG. 7 is a schematic diagram showing an offset optical system OOS" according to yet another embodiment of the present invention, when view in the z-direction, wherein a distance to an object K is close.

In this offset optical system OOS", assume that light incident from an object K located at a y-axial position $y_K$ to the primary mirror M is not parallel incident light as shown in FIG. 5.

From the following equation:

$$\frac{y_S}{y_K} = \frac{y_S - y_{FM}}{y_{FM}},$$

$y_S$ can be derived as follows:

$$y_S = \frac{y_{FM} \cdot y_K}{y_K - y_{FM}}$$

Further, from FIG. 7, the following equation can be obtained:

$$\frac{y_S}{x_{\alpha+d}} = \frac{y_S - y_L}{d}$$

This equation is transformed as follows:

$$x_{\alpha+d} = \frac{y_S \cdot d}{y_S - y_L}$$

Further, from FIG. 7, the following equation can be obtained:

$$\frac{x_{\alpha+d}}{y_K} = \frac{\alpha + d}{y_K - y_L}$$

Thus, the offset amount d is expressed as the following Equation (15), using the above equations:

$$d = \frac{y_{FM} y_k - y_L(y_k - y_{FM})}{y_L(y_K - 2y_{FM})} \cdot \alpha \quad (15)$$

Further, from FIG. 7, the following equation can be obtained:

$$\frac{y_S}{x_e} = \frac{y_S - y_L}{\alpha + d}$$

From this equation and the above equations for $y_S$ and d, the x-axial position $x_e$ of the edge MHe of the primary mirror MH is expressed as follows:

$$x_e = \frac{y_K y_{FM}^2 \alpha (y_K - y_L)}{\{y_{FM} y_K - y_L(y_K - y_{FM})\} y_L (y_K - 2y_{FM})} \quad (16)$$

In still another embodiment, an optical system may be formed by combining the offset optical system OOS, OOS' or OOS", and an offset optical system bearing a symmetrical relationship to the optical system OOS, OOS' or OOS" with respect to a y-z plane as a symmetry plane. That is, in this optical system, it is possible to use, as a primary mirror, a combination of a reflecting body MH, and a reflecting body bearing a symmetrical relationship to the reflecting body MH with respect to the y-z plane (e.g., a reflecting body identical to the reflecting boy M composed of the entirety of the solid line part and the dotted line part illustrated in FIG. 2). Further, a sub-mirror can be composed of a combination of a focusing body LH or a reflecting body LH', and a focusing body or a reflecting body which bears a symmetrical relationship to the focusing body LH or the reflecting body LH' with respect to the y-z plane (e.g., a combination of the cylindrical lens LH illustrated in FIG. 2, and a cylindrical lens having the same shape as that of the cylindrical lens LH and disposed at a position translated in the x-axis direction from the position of the cylindrical lens LH to become symmetrical to the cylindrical lens LH with respect to the y-z plane).

EXAMPLES

Example 1

Figure 8:
FIGS. 8(a) and 8(b) show photographs each taken using an offset optical system OOS (a concave-shaped reflecting mirror×a cylindrical lens).
Figure 8:

An example is shown in which a primary mirror MH having a reflecting surface which is part of a parabolic cylindrical surface, and a sub-mirror LH composed of a plano-concave-shaped cylindrical lens, are used. An offset optical system of this example is equivalent to the offset optical system OOS as shown in FIGS. 2 and 5. The primary mirror MH had a length in the x-axis direction (e.g., a length between O and $x_e$ in FIG. 5) of 220 mm, a length in the z-axis direction of 60 mm, and a thickness of 10 mm. Further, the sub-mirror LH had a length in the x-axis direction (e.g., the length α in FIG. 5) of 50 mm, and a length in the z-axis direction of 50 mm. The focal length of the primary mirror MH was 560 mm, and the focal length of the sub-mirror LH was 200 mm. In this offset optical system, the offset amount d of the sub-mirror LH was 27.8 mm. FIGS. 8(a) and 8(b) show photographs each taken by this offset optical system, wherein FIG. 8(a) is an image of a house at a distance of 200 m (i.e., $y_k$=200 m), and FIG. 8(b) is an image of the moon. Although the two images are stretched in a vertical direction, this distortion can be corrected by image processing or the like, as needed.

Example 2

Figure 9:
FIGS. 9(a) and 9(b) show photographs each taken using an offset optical system OOS' (a concave-shaped reflecting mirror×a concave-shaped reflecting mirror).
Figure 9:

An example is shown in which a primary mirror MH having a reflecting surface which is part of a parabolic cylindrical surface, and a sub-mirror LH' having a parabolic cylindrical-shaped reflecting surface, are used. An offset optical system of this example is equivalent to the offset optical system OOS' as shown in FIG. 6. The primary mirror MH had a length in the x-axis direction (e.g., the length between 0 and $x_e$ as with the example 1) of 300 mm, a length in the z-axis direction of 100 mm, and a thickness of 15 mm. Further, the sub-mirror LH' had a length a in the x-axis direction of 75 mm, a length in the z-axis direction of 100 mm, and a thickness of 15 mm. The focal length of the primary mirror MH was 1000 mm, and the focal length of the sub-mirror LH" was 430 mm. In this offset optical system, the offset amount d of the sub-mirror LH' was 56.6 mm. FIGS. 9(a) and 9(b) show photographs each taken by this offset optical system, wherein FIG. 9(a) is an image of a house at a distance of 200 m (i.e., $y_k$=200 m), and FIG. 9(b) is an image of the moon. Although the image of the moon is stretched in the vertical direction, this distortion can be corrected by image processing or the like, as needed.

LIST OF REFERENCE SIGNS

OS: conventional optical system
OOS, OOS', OOS": offset optical system
M, MH: primary mirror
MHe: edge of primary mirror MH
L, LH, LH': sub-mirror
S: screen
K: object
d: offset amount of sub-mirror LH
12, 12': reflecting surface of primary mirror M and reflecting surface of primary mirror MH
22, 22': cylindrical axis of sub-mirror L and cylindrical axis of sub-mirror LH
yM: y-axial position of each of primary mirror M and primary mirror MH
yL: y-axial position of each of sub-mirror L and sub-mirror LH
yFM: y-axial position of focus of each of primary mirror M and primary mirror MH
yFL: y-axial position of focus of each of sub-mirror L and sub-mirror LH
yS: y-axial position of screen S
yK: y-axial position of object K

The invention claimed is:

1. An offset optical system comprising:
a primary mirror composed of at least part of one of two optical element halves obtained by dividing an optical element having a concave shape curved only in one direction, in an intermediate position of a length along a curvature thereof, the optical element being configured to reflect and focus light from an object, into a linear focus;
a sub-mirror disposed between the primary mirror and the linear focus and configured to transmit or reflect light reflected by the primary mirror, thereby focusing the light into a point focus;
wherein, when: a direction tangent to the curvature in the intermediate position of the optical element is defined as an x-axis; a direction which is perpendicular to the x-axis and in which the object is located is defined as a y-axis; and a direction orthogonal to the x-axis and the y-axis is defined as a z-axis, the sub-mirror is offset parallel to the x-axis by a given distance toward an edge of the primary mirror located distal to the y-axis, wherein the sub-mirror comprises a plano-convex-shaped cylindrical lens, or a biconvex-shaped cylindrical lens, or a combination thereof, wherein the sub-mirror is disposed such that a cylindrical axis thereof is parallel to the x-axis.

2. The offset optical system as recited in claim 1, wherein the optical element has a shape with one selected from the group consisting of a parabolic cylindrical surface, a hyperbolic cylindrical surface, an elliptic cylindrical surface, and a circular cylindrical surface.

3. The offset optical system as recited in claim 1, wherein, when a focal length of the primary mirror, a focal length of the sub-mirror, and a distance between one of opposite edges farthest from the y-axis and the other edge nearest to the y-axis of the sub-mirror, are denoted, respectively, by 1/4a, f, and α, in a case where light from the object enters the primary mirror in a state of parallel incident light, and a reflecting surface of the optical element is expressed as the following equation: y=ax², the given distance d is expressed as the following equation:

$$d = \frac{4af\alpha}{1-4af}.$$

4. The offset optical system as recited in claim 1, wherein, when a focal length of the primary mirror, a position of the sub-mirror, a distance between one of opposite edges farthest from the y-axis and the other edge nearest to the y-axis of the sub-mirror and a position of the object, are denoted, respectively, by $y_{FM}$, $y_L$, α, and $y_K$, in a case where light from the object does not enter the primary mirror in a state of parallel incident light, and a reflecting surface of the optical element is expressed as the following equation: y=ax², the given distance d is expressed as the following equation:

$$d = \frac{y_{FM}y_K - y_L(y_K - y_{FM})}{y_L(y_K - 2y_{FM})} \cdot \alpha.$$

5. The offset optical system as recited in claim 1, wherein the sub-mirror has a concave shape curved only in one direction, and wherein the primary mirror and the sub-mirror are arranged in a positional relationship such that concave surfaces thereof are opposed to each other, and a direction of the curvature of the primary mirror is orthogonal to a direction of the curvature of the sub-mirror.

6. The offset optical system as recited in claim 5, wherein the sub-mirror has a shape with one selected from the group consisting of a parabolic cylindrical surface, a hyperbolic cylindrical surface, an elliptic cylindrical surface, and a circular cylindrical surface.

* * * * *